United States Patent
Lee et al.

(10) Patent No.: US 10,430,345 B2
(45) Date of Patent: Oct. 1, 2019

(54) ELECTRONIC DEVICE FOR CONTROLLING FILE SYSTEM AND OPERATING METHOD THEREOF

(71) Applicant: Samsung Electronics Co., Ltd., Gyeonggi-do (KR)

(72) Inventors: Woo-Joong Lee, Gyeonggi-do (KR); Sang-Woo Lee, Gyeonggi-do (KR); Jun-Beom Yeom, Gyeonggi-do (KR); Min-Jung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 359 days.

(21) Appl. No.: 15/228,567

(22) Filed: Aug. 4, 2016

(65) Prior Publication Data

US 2017/0046358 A1     Feb. 16, 2017

(30) Foreign Application Priority Data

Aug. 12, 2015   (KR) ........................ 10-2015-0114004

(51) Int. Cl.
| | |
|---|---|
| *G06F 16/00* | (2019.01) |
| *G06F 12/1009* | (2016.01) |
| *G06F 16/188* | (2019.01) |
| *G06F 12/109* | (2016.01) |

(52) U.S. Cl.
CPC ........ *G06F 12/1009* (2013.01); *G06F 12/109* (2013.01); *G06F 16/188* (2019.01); *G06F 2212/163* (2013.01); *G06F 2212/651* (2013.01); *G06F 2212/656* (2013.01); *G06F 2212/657* (2013.01)

(58) Field of Classification Search
CPC ........... G06F 12/0897; G06F 17/30233; G06F 2009/45583; G06F 2212/152; G06F 2212/222; G06F 12/1009; G06F 16/188; G06F 12/109; G06F 2212/163; G06F 2212/651; G06F 2212/656; G06F 2212/657
USPC ........................................................ 707/822
See application file for complete search history.

(56) References Cited

U.S. PATENT DOCUMENTS

| | | | | |
|---|---|---|---|---|
| 6,026,475 A * | 2/2000 | Woodman | ........... | G06F 11/3452 711/200 |
| 6,081,833 A * | 6/2000 | Okamoto | ............... | H04L 49/309 709/213 |
| 6,205,528 B1 * | 3/2001 | Kingsbury | .......... | G06F 12/1072 711/153 |
| 6,298,390 B1 * | 10/2001 | Matena | ............... | G06F 12/0866 719/315 |

(Continued)

*Primary Examiner* — Hanh B Thai
(74) *Attorney, Agent, or Firm* — The Farrell Law Firm, P.C.

(57) ABSTRACT

A method of operating an electronic device and the electronic device are provided. The method includes mounting at least one lower file system, which is configured to generate a file object managing a page cache, and mounting a highest file system, to which a virtual file system directly accesses, at a higher layer of a layer corresponding to the lower file system; in response to a file mapping request of a software program, generating a virtual memory area including a virtual address for a file corresponding to the file mapping request; and generating a first virtual address link between a file object of at least one lower file system having a page cache of a file corresponding to the file mapping request and the virtual memory area.

18 Claims, 12 Drawing Sheets

(56) References Cited

U.S. PATENT DOCUMENTS

| | | | | |
|---|---|---|---|---|
| 7,165,096 B2* | 1/2007 | Soltis | G06F 3/0605 | 707/999.001 |
| 2002/0002661 A1* | 1/2002 | Blumenau | G06F 3/061 | 711/165 |
| 2003/0101322 A1* | 5/2003 | Gardner | G06F 12/1491 | 711/163 |
| 2006/0143350 A1* | 6/2006 | Miloushev | G06F 9/5016 | 710/242 |
| 2007/0288682 A1* | 12/2007 | Czajkowski | G06F 9/544 | 711/2 |
| 2009/0037685 A1* | 2/2009 | Hansen | G06F 9/45558 | 711/171 |
| 2010/0064111 A1* | 3/2010 | Kunimatsu | G06F 12/08 | 711/161 |
| 2010/0122313 A1* | 5/2010 | Ivgi | G06F 21/6218 | 726/1 |
| 2010/0161976 A1* | 6/2010 | Bacher | G06F 9/541 | 713/164 |
| 2010/0274772 A1* | 10/2010 | Samuels | G06F 16/1748 | 707/693 |
| 2012/0110328 A1* | 5/2012 | Pate | G06F 21/6218 | 713/165 |
| 2012/0204060 A1* | 8/2012 | Swift | G06F 11/1435 | 714/15 |
| 2012/0216003 A1* | 8/2012 | Nakai | G06F 12/0246 | 711/163 |
| 2014/0195480 A1* | 7/2014 | Talagala | G06F 12/0804 | 707/610 |
| 2014/0195564 A1* | 7/2014 | Talagala | G06F 12/0804 | 707/802 |
| 2015/0134930 A1* | 5/2015 | Huang | G06F 12/1009 | 711/206 |
| 2015/0193170 A1* | 7/2015 | Sundaram | G06F 3/0641 | 711/103 |
| 2015/0193338 A1* | 7/2015 | Sundaram | G06F 3/0688 | 711/103 |
| 2016/0344834 A1* | 11/2016 | Das | H04L 67/2842 | |

* cited by examiner

ELECTRONIC DEVICE FOR CONTROLLING FILE SYSTEM AND OPERATING METHOD THEREOF

PRIORITY

This application claims priority under 35 U.S.C. § 119(a) to Korean Patent Application Serial No. 10-2015-0114004, which was filed in the Korean Intellectual Property Office on Aug. 12, 2015, the entire content of which is incorporated herein by reference.

BACKGROUND

1. Field of the Disclosure

The present disclosure relates generally to file systems mounted in a memory, and more specifically, to an electronic device and an operating method for controlling a file system mounted in a memory.

2. Description of the Related Art

An electronic device may configure file data in storage, by using a file system of an operating system, and read and write the file data to the storage using the file system.

When designing an electronic device file system, one or more file system layers may be designed using a stackable layer according to purpose. The electronic device may mount a native file system for performing operations with respect to the file data in a memory and may mount stackable file systems to a native file system. A file system that mounts the stackable file systems to a native file system is referred to as a hierarchical file system.

Stackable file systems may independently be mounted or unmounted in the memory, and may perform a specific function or a specific operation.

A file system included a hierarchical file system may optionally include a page cache. However, in a file system of a hierarchical file system, it is difficult to check whether files of stackable file systems manage the page cache.

When an electronic device maps any file in an address space of an application program, when a predetermined file, which does not have the page cache, of the file system included in the hierarchical file system is mapped, coherence between virtual memory management structures may get damaged.

SUMMARY

The present disclosure has been made to address at least the above-mentioned problems and/or disadvantages and to provide at least the advantages described below.

An aspect of the present disclosure is to efficiently manage the stackable file systems to be mounted with the superposed manner or independently.

According to an aspect of the present disclosure, the hierarchical file system may generate a virtual address link for the virtual memory space related to the virtual address, and may stably manage the virtual memory area according to memory mapping.

According to an aspect of the present disclosure, the stackable file systems are efficiently managed, thereby increasing efficiency of memory use and improving a processing speed.

In accordance with an aspect of the present disclosure, an electronic device is provided. The electronic device includes a non-volatile storage; a volatile memory that stores at least one software program; and a processor electrically connected to the storage and the memory, wherein the storage stores an instruction by which, at a time of execution thereof, the processor mounts at least one lower file system configured to generate a file object managing a page cache in the memory, mounts a highest file system which a virtual file system directly accesses to above the lower file system in the memory, in response to a file mapping request of the software program, generates a virtual memory area including a virtual address for a file corresponding to the file mapping request in the memory, and generates a first virtual address link between the file object of the at least one lower file system having a page cache of the file corresponding to the file mapping request and the virtual memory area.

In accordance with another aspect of the present disclosure, a method of operating an electronic device is provided. The method includes mounting at least one lower file system configured to generate a file object managing a page cache, and mounting a highest file system which a virtual file system directly accesses to a higher layer of a layer corresponding to the lower file system in the memory; generating a virtual memory area including a virtual address for a file corresponding to a file mapping request, in response to the file mapping request by the software program; and generating a first virtual address link between the file object of the at least one lower file system having the page cache of the file corresponding to the file mapping request and the virtual memory area.

In accordance with another aspect of the present disclosure, an electronic device is provided. The electronic device includes a non-volatile storage; a volatile memory that stores at least one software program; and a processor electrically connected to the storage and the memory, wherein the storage stores instructions by which, at a time of execution thereof, the processor mounts a first file system configured not to manage at least a part of data of a file used by the software program, in the memory, mounts a second file system configured to manage the at least a part of data of the file used by the software program, in the memory, receives a request of address information in the memory of the file by the software program, and provides the address information of the memory of the file stored in the second lower file system in response to the request.

According to various embodiments of the present disclosure, an electronic device for controlling a file system and an operating method thereof may be provided. Therefore, the electronic device according to various embodiments of the present disclosure may configure a link connecting the same files mounted in multiple stackable file systems, and may provide a flag indicating whether each page maintains the page cache in a plurality of file systems included in the stackable file systems, on the basis of the configured link. Accordingly, the electronic device according to various embodiments of the present disclosure may provide a valid file according to the virtual memory area on the basis of the provided flag. Further, the electronic device according to various embodiments of the present disclosure may check the valid file even if page migration or page reclaiming is performed, on the basis of a valid virtual address link when the memory mapping is performed.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
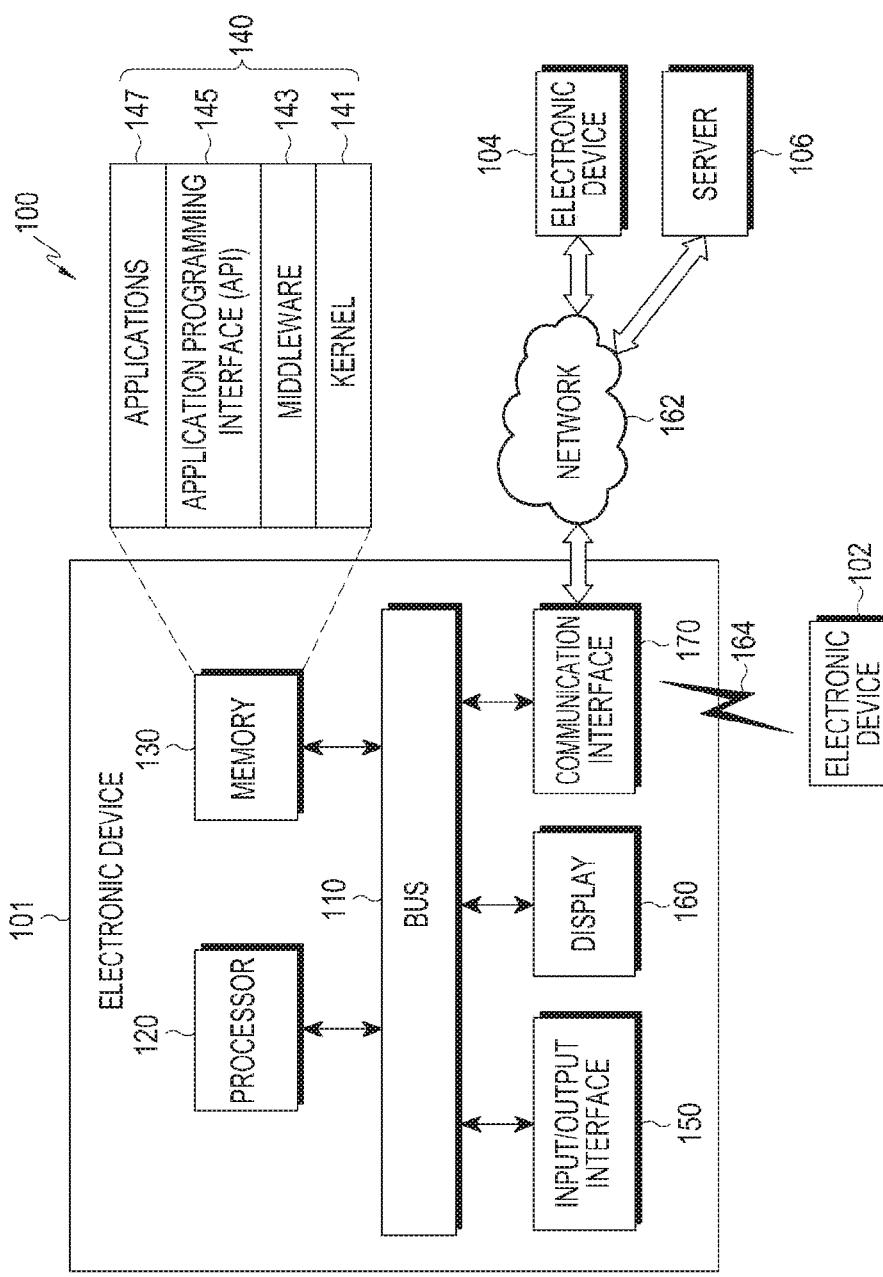
FIG. 1 is a block diagram of an electronic device and a network according to embodiments of the present disclosure.

Hereinafter, embodiments of the present disclosure are described with reference to the accompanying drawings. The present disclosure is not limited to the particular embodiments disclosed herein, but covers various modifications, equivalents, and/or alternatives of embodiments of the present disclosure. With reference to the drawings, the same or similar reference numerals may be used to designate the same or similar constituent elements.

As used herein, the expressions "have", "may have", "include", and "may include" refer to the existence of a corresponding feature (e.g., numeral, function, operation, or constituent element such as component), and do not exclude one or more additional features.

In the present disclosure, the expressions "A or B", "at least one of A or/and B", and "one or more of A or/and B" may include all possible combinations of the items listed. For example, the expressions "A or B", "at least one of A and B", and "at least one of A or B" refer to all of (1) including at least one A, (2) including at least one B, and (3) including all of at least one A and at least one B.

The expressions "a first", "a second", "the first", and "the second" used in embodiments of the present disclosure may modify various components regardless of the order and/or the importance but does not limit the corresponding components. For example, a first user device and a second user device indicate different user devices, although both of the devices are user devices. For example, a first element may be referred to as a second element, and similarly, a second element may be referred to as a first element without departing from the scope of the present disclosure.

When an element (e.g., a first element) is referred to as being (operatively or communicatively) "connected," or "coupled," to another element (e.g., a second element), this element may be directly connected or coupled directly to the other element or any other element (e.g., third element) may be interposed between them. By contrast, when an element (e.g., a first element) is referred to as being "directly connected," or "directly coupled" to another element (e.g., a second element), there are no element (e.g., a third element) interposed between them.

The expression "configured to", as used herein, may be used interchangeably with, for example, "suitable for", "having the capacity to", "designed to", "adapted to", "made to", or "capable of" according to the situation. The term "configured to" may not necessarily imply "specifically designed to" with respect to hardware. Alternatively, in some situations, the expression "device configured to" may mean that the device, together with other devices or components, "is able to". For example, the phrase "processor adapted (or configured) to perform A, B, and C" may refer to a dedicated processor (e.g., an embedded processor) used only to perform the corresponding operations or a generic-purpose processor (e.g., a central processing unit (CPU) or an application processor (AP)) that can perform the corresponding operations by executing one or more software programs stored in a memory device.

The terms used herein are merely used for the purpose of describing particular embodiments and do not limit the scope of other embodiments of the present disclosure. As used herein, singular forms of terms may include plural forms as well, unless the context clearly indicates otherwise. Unless defined otherwise, all terms used herein, including technical and scientific terms, have the same definitions as those commonly understood by a person skilled in the art to which the present disclosure pertains. Such terms as those defined in a generally used dictionary may be interpreted to have the same definitions as the contextual definitions in the relevant field of art, and are not to be interpreted to have ideal or excessively formal definitions, unless clearly defined in the present disclosure. In some cases, even terms defined in the present disclosure should not be interpreted in a manner that excludes embodiments of the present disclosure.

An electronic device according to embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. The wearable device may include at least one type of accessory (e.g., a watch, a ring, a bracelet, an anklet, a necklace, a glasses, a contact lens, or a Head-Mounted Device (HMD)), a fabric or clothing integrated type (e.g., an electronic clothing), a body-mounted accessory (e.g., a skin pad, or tattoo), and a bio-implantable accessory (e.g., an implantable circuit).

According to some embodiments of the present disclosure, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box, a game console, an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller machine (ATM) in banks, point of sales (POS) device in a shop, or Internet of things device (e.g., a light bulb, various sensors, electric or gas meter, a sprinkler device, a fire alarm, a thermostat, a streetlamp, a toaster, sporting goods, a hot water tank, a heater, a boiler, etc.).

According to some embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include a new electronic device according to the development of technology.

Hereinafter, an electronic device according to embodiments will be described with reference to the accompanying drawings. In the present disclosure, the term "user" may indicate a person using an electronic device or a device (e.g., an artificial intelligence electronic device) using an electronic device.

FIG. 1 is a block diagram of an electronic device and a network according to embodiments of the present disclosure.

Referring to FIG. 1, an electronic device 101 within a network environment 100 includes a bus 110, a processor 120, a memory 130, an input/output interface 150, a display 160, and a communication interface 170. The electronic device 101 may omit at least one of the above elements or may further include other elements.

The bus 110 may include, for example, a circuit for interconnecting the elements 110 to 170 and transferring communication (for example, control messages and/or data) between the elements.

The processor 120 may include one or more of a Central Processing Unit (CPU), an Application Processor (AP), and a Communication Processor (CP). For example, the processor 120 may carry out operations or data processing related to control and/or communication of at least one other component of the electronic device 101.

The memory 130 may include a volatile memory and/or a non-volatile memory. The memory 130 may store, for example, instructions or data relevant to at least one other element of the electronic device 101. According to an embodiment of the present disclosure, the memory 130 may store software and/or a program 140. The program 140 includes a kernel 141, middleware 143, an Application Programming Interface (API) 145, and application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used to perform an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the processor 120, the memory 130, etc.) of the electronic device 101, to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160, for example, may display various types of contents (for example, text, images, videos, icons, or symbols) for the user. The display 160 may include a touch screen, and may receive, for example, a touch, gesture, proximity, or hovering input by using an electronic pen or a part of the user's body.

The communication module 170, for example, may set communication between the electronic device 101 and an external device (e.g., a first external electronic device 102, a second external electronic device 104, or a server 106). For example, the communication module 170 may be connected to a network 462 through wireless or wired communication to communicate with the external device (for example, the second external electronic device 104 or the server 106).

The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short range communication 164 may include, for example, at least one of Wi-Fi, Bluetooth, near field communication (NFC), global navigation satellite system (GNSS), and the like. The GNSS may include at least one of, for example, a global positioning system (GPS), a global navigation satellite system (Glonass), a Beidou Navigation Satellite System (Beidou), and a European Global Satellite-based Navigation System (Galileo), according to a use area, a bandwidth, or the like. Hereinafter, the term "GPS" may be used interchangeably used with the term "GNSS". The wired communication may include, for example, at least one of a universal serial bus (USB), a high definition multimedia interface (HDMI), recommended standard 232 (RS-232), and a plain old telephone service (POTS). The network 462 may include at least one of a communication network such as a computer network (for example, a local area network (LAN) or a wide area network (WAN)), the Internet, and a telephone network.

Each of the first and second external electronic devices 102 and 104 may be of a type identical to or different from a type of the electronic device 101. According to an embodiment of the present disclosure, the server 106 may include a group of one or more servers. All or some of the operations performed in the electronic device 101 may be performed in the first external electronic device 102, the second external electronic device 104, and/or the server 106. When the electronic device 101 has to perform some functions or services automatically or in response to a request, the electronic device 101 may make a request for performing at least some functions relating thereto to the first external electronic device 102, the second electronic device 104, and/or the server 106 in addition to or instead of performing the functions or services by itself. The first external electronic device 102, the second external electronic device 104, and/or the server 106 may execute the requested functions or the additional functions, and may deliver a result of the execution to the electronic device 101. The electronic device 101 may process the received result as it is or additionally process the result to provide the requested functions or services. To achieve this, for example, cloud computing, distributed computing, or client-server computing technology may be used.

Figure 2:
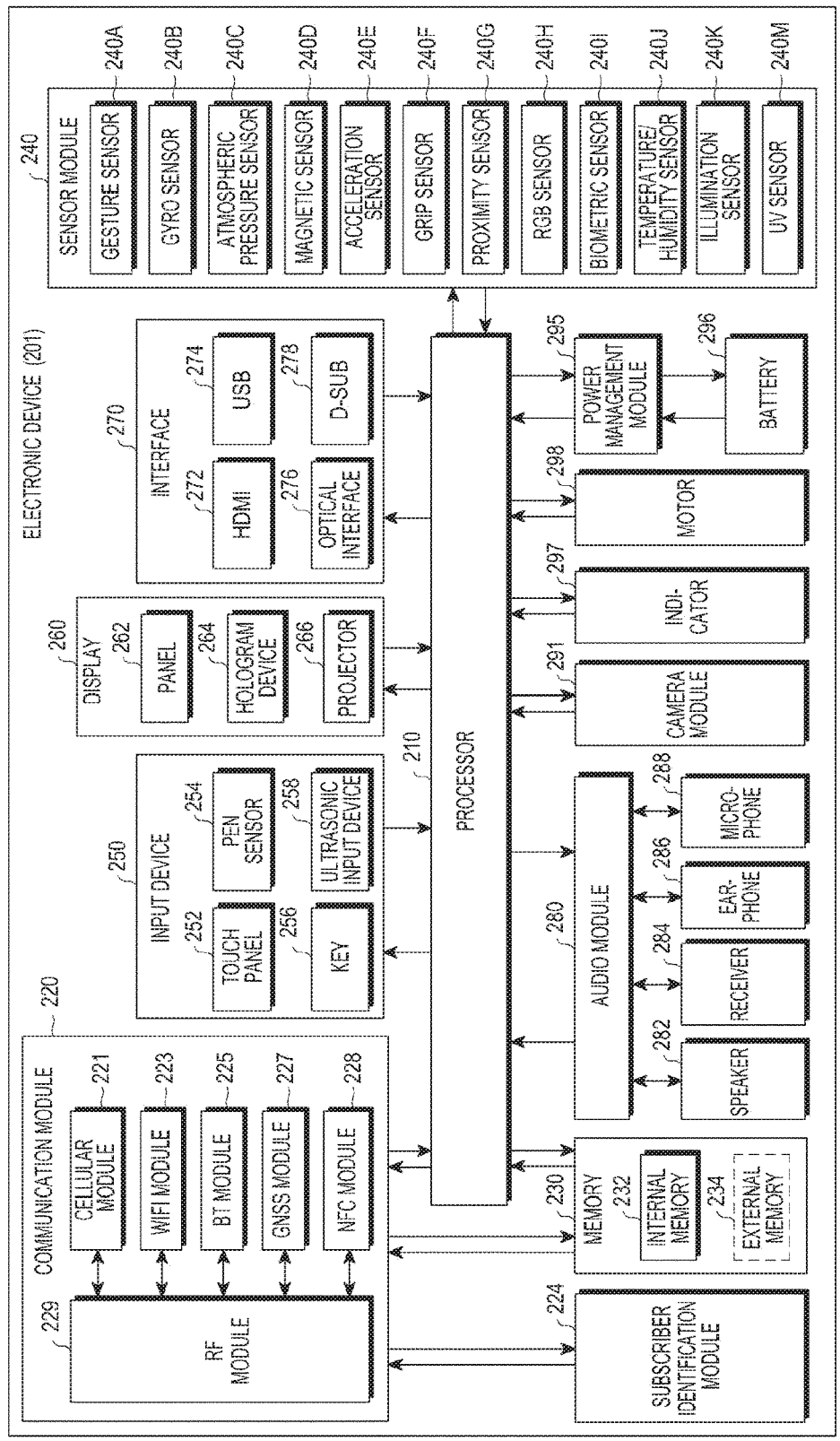
FIG. 2 is a block diagram of an electronic device according to embodiments of the present disclosure.

FIG. 2 is a block diagram of an electronic device 201 according to embodiments of the present disclosure. The electronic device 201 may include, for example, all or part of the electronic device 101 illustrated in FIG. 1. The electronic device 201 includes at least one processor 210 (e.g., an application processor (AP)), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a system on chip (SoC). According to an embodiment of the present disclosure, the processor 210 may further include a graphic processing unit (GPU) and/or an image signal processor. The processor 210 may include at least some (e.g., a cellular module 221) of the elements illustrated in FIG. 2. The processor 210 may load, into a volatile memory, instructions or data received from at least one of the other elements (e.g., a non-volatile memory) and may process the loaded instructions or data, and may store various data in a non-volatile memory.

The communication module 220 may have a configuration equal or similar to that of the communication interface 170 of FIG. 1. The communication module 220 includes, for example, a cellular module 221, a Wi-Fi module 223, a Bluetooth module 225, a GNSS module 227 (e.g., a GPS module, a Glonass module, a Beidou module, or a Galileo module), an NFC module 228, and a radio frequency (RF) module 229.

The cellular module 221 may provide a voice call, an image call, a text message service, or an Internet service through, for example, a communication network. According to an embodiment of the present disclosure, the cellular module 221 may identify and authenticate the electronic device 201 within a communication network using a subscriber identity module (SIM) 224. The cellular module 221 may perform at least some of the functions that the processor 210 may provide. The cellular module 221 may include a communication processor (CP).

The Wi-Fi module 223, the Bluetooth module 225, the GNSS module 227, or the NFC module 228 may include, for example, a processor that processes data transmitted and received through the corresponding module. According to some embodiments of the present disclosure, two or more of the cellular module 221, the Wi-Fi module 223, the BT module 225, the GNSS module 227, and the NFC module 228 may be included in one integrated chip (IC) or IC package.

The RF module 229 may transmit/receive, for example, a communication signal (e.g., an RF signal). The RF module 229 may include, for example, a transceiver, a power amp module (PAM), a frequency filter, a low noise amplifier (LNA), or an antenna. According to another embodiment of the present disclosure, at least one of the cellular module 221, the Wi-Fi module 223, the BT module 225, the GNSS module 227, and the NFC module 228 may transmit/receive an RF signal through a separate RF module.

The SIM 224 may include, for example, a card including an embedded SIM, and may contain unique identification information (for example, an integrated circuit card identifier (ICCID)) or subscriber information (e.g., an international mobile subscriber identity (IMSI)).

The memory 230 (e.g., the memory 130) includes, for example, an internal memory 232 or an external memory 234. The embedded memory 232 may include at least one of, for example, a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a flash memory (for example, a NAND flash memory or a NOR flash memory), a hard drive, or a solid state drive (SSD).

The external memory 234 may further include a flash drive, for example, a compact flash (CF), a secure digital (SD), a micro secure digital (Micro-SD), a mini SD (Mini-SD), an eXtreme digital (xD), multi-media card (MMC), a memory stick, etc. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 includes, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. According to some embodiments of the present disclosure, an electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, and an ultrasonic input unit 258. The touch panel 252 may use at least one of, for example, a capacitive scheme, a resistive scheme, an infrared scheme, and an ultrasonic scheme. Further, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone 288 and identify data corresponding to the detected ultrasonic waves.

The display 260 (e.g., the display 160) may include a panel 262, a hologram device 264 or a projector 266. The panel 262 may include a configuration identical or similar to a configuration of the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, an HDMI interface 272, a USB interface 274, an optical interface 276, or a D-subminiature (D-sub) interface 278. The interface 270 may be included in, for example, the communication interface 170 illustrated in FIG. 1. Additionally or alternatively, the interface 270 may include, for example, a Mobile High-definition Link (MHL) interface, an SD/MMC interface, or an infrared data association (IrDA) standard interface.

The audio module 280 may bilaterally convert, for example, a sound and an electrical signal. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288 and the like.

The camera module 291 is a device which may photograph a still image and a dynamic image. According to an embodiment of the present disclosure, the camera module 291 may include one or more image sensors (for example, a front sensor or a back sensor), a lens, an image signal processor (ISP) or a flash (e.g., a light emitting diode (LED) or a xenon lamp).

The power management module 295 may manage, for example, power of the electronic device 201. According to an embodiment of the present disclosure, the power management module 295 may include a power management integrated circuit (PMIC), a charger integrated circuit (IC), or a battery gauge. The PMIC may use a wired and/or wireless charging method. The wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, a voltage, a current, or a temperature during charging. The battery 296 may include, for example, a rechargeable battery or a solar battery.

The indicator 297 may indicate a particular state (e.g., a booting state, a message state, a charging state, etc.) of the electronic device 201 or a part (for example, the processor 210) of the electronic device 201. The motor 298 may convert an electrical signal into mechanical vibration, and may generate vibration, a haptic effect, etc. The electronic device 201 may include a processing unit (for example, a GPU) for supporting a mobile television (TV). The processing unit for supporting mobile TV may, for example, process media data according to a certain standard such as digital multimedia broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. The electronic device according to embodiments of the present disclosure may include at least one of the aforementioned elements. Some elements may be omitted or other additional elements may be further included in the electronic device. Also, some of the hardware components according to embodiments may be combined into one entity, which may perform functions identical to those of the relevant components before the combination.

Figure 3:
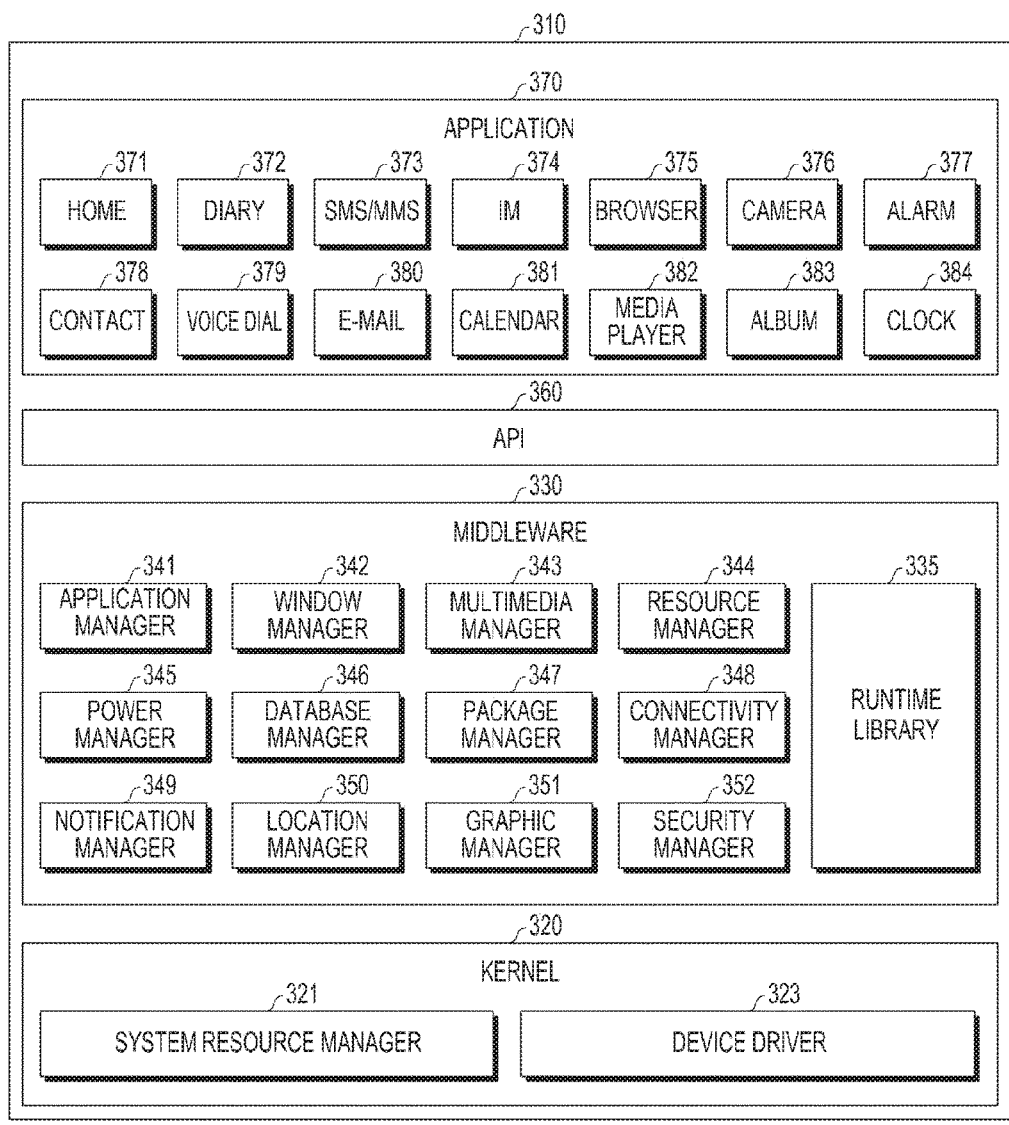
FIG. 3 is a block diagram of a program module according to embodiments of the present disclosure.

FIG. 3 is a block diagram of a program module according to embodiments of the present disclosure.

Referring to FIG. 3, according to an embodiment of the present disclosure, the program module 310 (e.g., the program 140) may include an operating system (OS) for controlling resources related to the electronic device (e.g., the electronic device 101) and/or various applications (e.g., the application programs 147) executed in the operating system. The operating system may be, for example, Android, iOS, Windows, Symbian, Tizen, Bada, etc.

The program module 310 includes a kernel 320, middleware 330, an application programming interface (API) 360, and/or applications 370. At least a part of the program module 310 may be preloaded on the electronic device, or may be downloaded from an external electronic device (e.g., the first external electronic device 102, the second external electronic device 104, or the server 106).

The kernel 320 (for example, the kernel 141) includes, for example, a system resource manager 321 and/or a device driver 323. The system resource manager 321 may control, assign, or collect system resources. According to an embodiment of the present disclosure, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide a function required by the applications 370 in common or provide various functions to the applications 370 through the API 360 so that the applications 370 can efficiently use limited system resources within the electronic device. According to an embodiment of the present disclosure, the middleware 330 (e.g., the middleware 143) includes, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add new functions through a programming language while the applications 370 are executed. The runtime library 335 may perform input/output management, memory management, or a function for an arithmetic function.

The application manager 341 may, for example, manage a life cycle of at least one of the applications 370. The window manager 342 may manage graphical user interface (GUI) resources used on a screen. The multimedia manager 343 may identify formats required for the reproduction of various media files and encode or decode a media file using a codec suitable for the corresponding format. The resource manager 344 may manage resources of at least one of the applications 370, such as a source code, a memory, and a storage space.

The power manager 345 may operate together with, for example, a basic input/output system (BIOS) to manage a battery or power and may provide power information required for the operation of the electronic device. The database manager 346 may generate, search for, and/or change a database to be used by at least one of the applications 370. The package manager 347 may manage the installation or the updating of an application distributed in the form of a package file.

The connectivity manager 348 may manage a wireless connection such as, for example, Wi-Fi or Bluetooth. The notification manager 349 may display or notify of an event, such as an arrival message, an appointment, proximity notification, and the like, in such a manner of not disturbing a user. The location manager 350 may manage location information of the electronic device. The graphic manager 351 may manage a graphic effect to be provided to a user and a user interface relating to the graphic effect. The security manager 352 may provide all security functions required for system security or user authentication. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms combinations of various functions of the above described elements. The middleware 330 may provide modules specialized according to types of operating systems in order to provide differentiated functions. Furthermore, the middleware 330 may dynamically remove some of the existing elements, or may add new elements.

The API 360 (e.g., the API 145) is, for example, a set of API programming functions, and may be provided with a different configuration according to an OS. For example, when the operating system is Android or iOS, one API set may be provided for each platform, and when the operating system is Tizen, two or more API sets may be provided for each platform.

The applications 370 (e.g., the application programs 147) may include, for example, one or more applications that can perform functions, such as home 371, dialer 372, short message service (SMS)/multimedia messaging service (MMS) 373, instant message (IM) 374, browser 375, camera 376, alarm 377, contacts 378, voice dialer 379, e-mail 380, calendar 381, media player 382, album 383, clock 384, health care (e.g., measure exercise quantity or blood sugar), or environment information (e.g., atmospheric pressure, humidity, temperature information etc.).

According to an embodiment of the present disclosure, the applications 370 may include an information exchange application, for convenience of description, supporting information exchange between the electronic device 101 and the first external electronic device 102 or the second external electronic device 104. The information exchange application may include, for example, a notification relay application for transferring specific information to an external electronic device or a device management application for managing an external electronic device.

For example, the notification relay application may include a function of transferring, to the first external electronic device 102 or the second external electronic device 104, notification information generated from other applications of the electronic device 101 (for example, an SMS/MMS application, an e-mail application, a health management application, or an environmental information application). Further, the notification relay application may receive notification information from, for example, an external electronic device and provide the received notification information to a user.

The device management application may manage (for example, install, delete, or update), for example, at least one function of the first external electronic device 102 or the second external electronic device 104 communicating with the electronic device (for example, a function of turning on/off the external electronic device itself (or some components) or a function of adjusting luminance (or a resolution) of the display), applications operating in the external electronic device, or services provided by the external electronic device (e.g., a call service and a message service).

According to an embodiment of the present disclosure, the applications 370 may include applications (e.g., a health care application of a mobile medical appliance or the like) designated according to attributes of the first external electronic device 102 or the second external electronic device 104. The applications 370 may include an application received from the server 106, the first external electronic device 102, or the second external electronic device 104. The applications 370 may include a preloaded application or a third party application which can be downloaded from the server. Names of the elements of the program module 310, according to the above-described embodiments of the present disclosure, may change depending on the type of OS.

According to embodiments of the present disclosure, at least some of the program module 310 may be implemented in software, firmware, hardware, or a combination of two or more thereof. At least some of the program module 310 may be implemented (e.g., executed) by, for example, the processor 210. At least some of the program module 310 may include, for example, a module, a program, a routine, a set of instructions, and/or a process for performing one or more functions.

Figure 4:
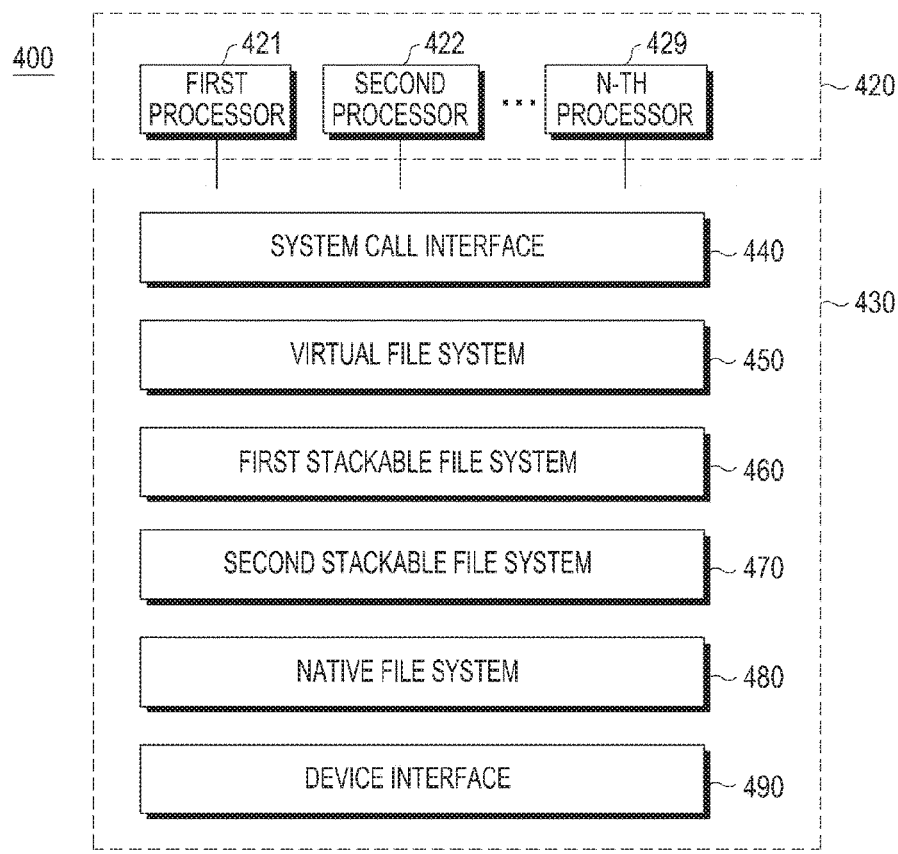
FIG. 4 is a block diagram illustrating a configuration of a program module according to embodiments of the present disclosure.

FIG. 4 is a block diagram illustrating a configuration of a program module according to embodiments of the present disclosure.

Referring to FIG. 4, a program module 400 is conceptually divided into an application program 420 operated in a user address space in a virtual memory and an operating system 430 operated in a kernel address space.

The application program 420 may refer to programs operated in the user address space, that is, user processes. The application program 420 includes, for example, a first process 421, a second process 422, and an n$^{th}$ process 429. Each of processes 421, 422, and 429 may have its own separate address space. The application program 420 may generate a memory space (buffer) in its own address space, and read a predetermined file from the file system of a kernel or write the file in a file system. The application program 420 may be corresponded to the application 370, API 360, and the middleware 330 in FIG. 3.

The operating system 430 may be corresponded to the kernel 320 in FIG. 3. According to embodiments of the present disclosure, the operating system 430 may include a system call interface 440, a virtual file system 450, a first stackable file system 460, a second stackable file system 470, a native file system 480, and a device interface 490.

Further, the operating system 430 may further include another file system other than the file system.

The system call interface 440 corresponds to an interface which enables the application program 420 of a user area to use a function of the operating system 430 of a kernel area, and may provide a function which enables at least one process to access hardware.

The virtual file system 450 may provide a file system interface to the application program 420. For example, the virtual file system 450 enables the application program to access any kind of a file system in the same method. Further, the virtual file system 450 may refer to an abstract layer above an actual file system.

The first stackable file system 460 may be mounted or un-mounted at a higher layer of a layer corresponding to another file system in a run-time of the operating system 430. The first stackable file system 460 may perform at least one function or at least one operation. The first stackable file system 460 may be a highest layer file system interfaced by the virtual file system 450, and may be mounted at a higher layer of a layer corresponding to the second stackable file system 470 or the native file system 480.

The second stackable file system 470 may be mounted or un-mounted at the higher layer of a layer corresponding to another file system in a run-time of the operating system 430. The second stackable file system 470 may perform at least one function or at least one operation. The second stackable file system 470 may be a lower layer file system of the first stackable file system 460, and may be mounted at the higher layer of a layer corresponding to the native file system 480. In embodiments of the present disclosure, the second stackable file system 470 may be omitted. Further, third and fourth stackable file systems may be configured in a lower layer of a layer corresponding to the second stackable file system. Therefore, in embodiments of the present disclosure, a depth of a layer is not limited to a specific depth.

According to an embodiment of the present disclosure, the stackable file systems 460 and 470 may be various kinds of stackable file system depending on aspects, respectively. For example, one stackable file system may be a compression file system for compressing and releasing the file data, and may be an encryption file system for encrypting/decrypting the file data. Further, the stackable file systems may be a permission management file system for managing permission of a directory and a file according to an aspect of the electronic device without correcting the file data. The description of the stackable file systems are simply examples, and a stackable file system having another aspect other than the stackable file system may be mounted or unmounted. Meanwhile, the stackable file systems may have or may not have a page cache of the file data within a layer according to the aspects. For example, the first stackable file system 460 may have the page cache of the file, and operate and manage the file. A permission management file system for managing a directory permission may not manage the page cache of the file.

The native file system 480 may directly access a lower level media such as a disk (storage) and a network. For example, the native file system 480 may be a file system for directly accessing a storage 595 device driver. An FAT of a window operating system or an Ext of LINUX may be used as the native file system 480, but the native file system 480 according to embodiments of the present disclosure does not limit a specific file system. The native file system 480 may also be used by being mounted in the run-time of the operating system 430, and will be described as a "file system of the lowest layer" in the remaining part of the specification. Further, the native file system performs an input/output with a disk through a generic block layer within a kernel. Then, at a time point when the native file system should perform the input/output (I/O) with an actual disk (e.g., storage), the native file system may request I/O to a block device driver.

According to an embodiment of the present disclosure, one or more the stackable file systems 460 and 470 and the native file system 480 may be expressed as a current file system, a higher file system, a lower file system, a highest file system, and a lowest file system according to a relationship mounted therebetween.

Herein, a plurality of file systems, which are mounted and configured to be overlapped in the memory of the electronic device, may be referred to as a "whole file system" or a "plurality of file systems". According to an embodiment of the present disclosure, the "whole file system" may include one native file system and at least one stackable file system. As an alternative, the "whole file system" may be configured by the one or more stackable file systems.

The device interface 490 may provide an interface with at least one device. For example, the device interface 490 may provide an interface with the storage to be described below. According to an embodiment of the present disclosure, the device interface 490 may include a device driver for the storage.

Figure 5:
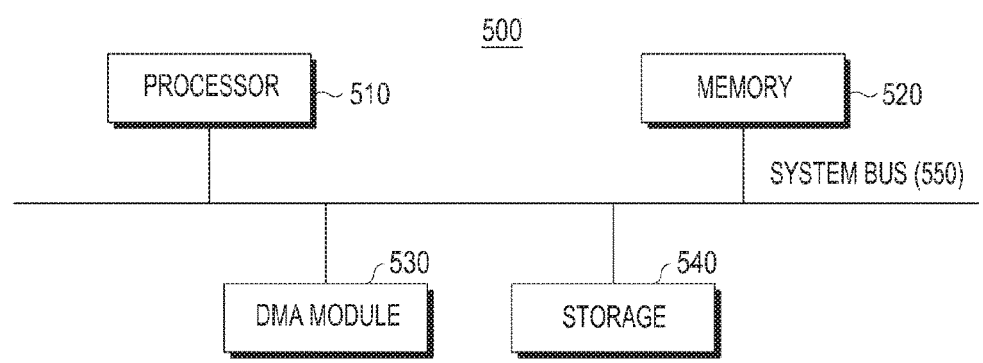
FIG. 5 is a block diagram illustrating a configuration of an electronic device according to embodiments of the present disclosure.

FIG. 5 is a block diagram illustrating a configuration of an electronic device according to embodiments of the present disclosure.

Referring to FIG. 5, an electronic device 500 includes a processor 510, a memory 520, a direct memory access (DMA) module 530, and storage 540. The processor 510, the memory 520, the DMA module 530, and the storage 540 may be connected to a system bus 550.

The processor 510 may be the processors 120 and 210 and may be a part of the processors 120 and 210. The processor 510 may execute a code of the program module 400 in FIG. 4, and then perform a command corresponding to the code. The processor 510 may instruct the DMA module 530 to copy data between the memory 520 and the storage 540.

The memory 520 may store a code and data of the program module 400 described in FIG. 4. The memory 520 may correspond to the volatile memory described in FIGS. 1 and 2. According to an embodiment of the present disclosure, the memory 520 may store at least one software program. Herein, the software program may include at least one of an application program, a process loader, a library loader program, and a combination thereof. The memory 520 may include a plurality of buffers.

The DMA module 530 transmits data between the memory areas, and between the memory 520 and an I/O device. For example, the DMA module 530 may configure a channel to the memory 520 and the storage 540, thereby detouring the processor. The DMA module 530 may be located in the storage controller in an application processor (AP), but is not limited to a specific position in accordance with embodiments of the present disclosure.

The storage 540 is a data storage device, and may include a non-volatile memory and/or the recoding medium described in FIGS. 1 and 2. The native file system 480 may store at least one file stored in the storage 540.

The system bus 550 may be a path in which the processor 510, the memory 520, the DMA module 530, and the storage 540 transmit and receive data to and from another component, respectively.

Figure 6:
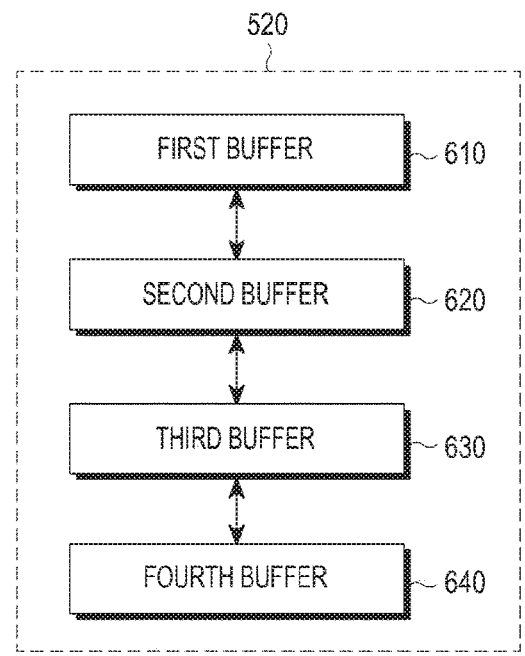
FIG. 6 is a block diagram illustrating a configuration of a buffer included in a memory according to embodiments of the present disclosure.

FIG. 6 is a block diagram illustrating a configuration of a buffer included in a memory according to embodiments of the present disclosure.

Referring to FIG. 6, the memory 520 includes a first buffer 610, a second buffer 620, a third buffer 630, and a fourth buffer 640.

The first buffer 610 may be generated for a file in the application program 420.

The second buffer 620 may be a page cache buffer of a file included in the first stackable file system 460.

The third buffer 630 may be a page cache buffer of a file included in the second stackable file system 470.

The fourth buffer 640 may be a page cache buffer of a file included in the native file system 480.

In FIG. 6, the virtual file system 450 and buffers for block layers are omitted in the memory 520 and the virtual file system 450 and buffers, which correspond to block layers respectively, may be included in the memory 520.

Meanwhile, the stackable file systems may not have a page cache buffer for the data according to a file system policy or a specific file. Therefore, the memory 520 may not include a buffer corresponding to the specific stackable file system.

Meanwhile, the electronic device 101 according to embodiments of the present disclosure may configure, read, and write file data in the storage through the file system included in the operating system 430, which is described with reference to FIG. 8.

Figure 7:
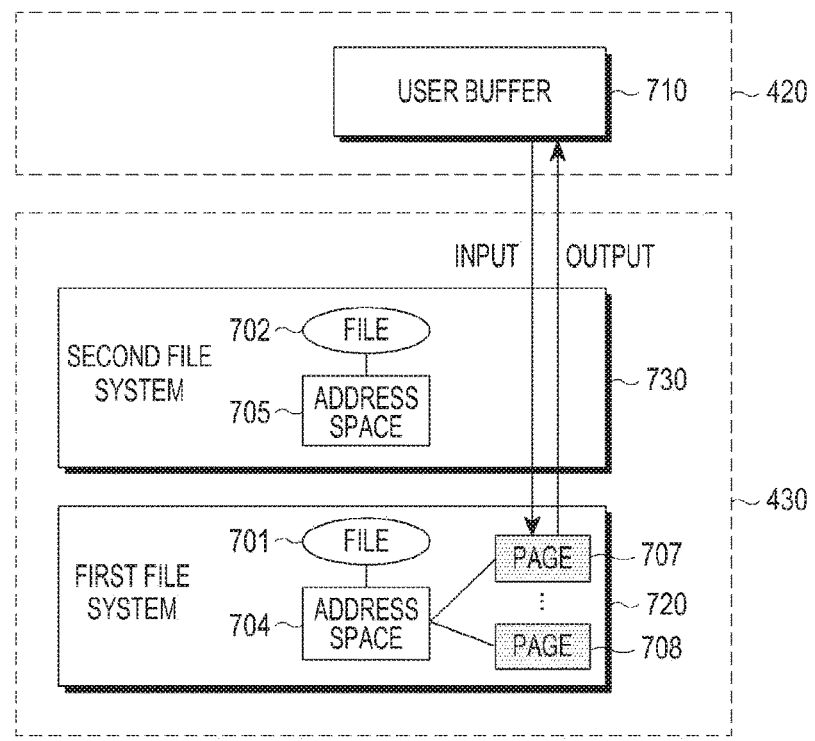
FIGS. 7 and 8 are conceptual diagrams illustrating an operation of a stackable file system according to embodiments of the present disclosure.

FIG. 7 is a conceptual diagram illustrating an operation of a stackable file system according to embodiments of the present disclosure.

Referring to FIG. 7, a first file system 720 and a second file system 730 may be mounted in the operating system 430.

Specifically, the first file system 720 may be mounted in a main memory of the program module 400, and the second file system 730 at a higher layer of a layer corresponding to the first file system 720 may be mounted in the main memory of the program module 400. Herein, the first file system 720 may be a native file system for operating file data by an input/output device (e.g., the storage or the network). Further, the first file system 720 may be a stackable file system mounted in another file system.

Also, the second file system 730 may be a stackable file system. The second file system 730 may be a highest file system which is interfaced by a virtual file system. The stackable file systems may be various kinds of stackable file system according to purpose. For example, one stackable file system may be a compression file system for compressing and releasing the file data, and may be an encryption file system for encrypting/decrypting the file data. Further, the stackable file systems may be a permission management file system for managing permission of a directory and a file according to an aspect of the electronic device without correcting the file data. When at least one application process included in the application program 420 opens a file and inputs/outputs the file to a user buffer 710, the second file system 730 may not have page cache. For example, as shown in FIG. 7, one or more pages 707 and 708 corresponding to an opening file 701 may be stored in the first file system 720. The pages 707 and 708 stored in the first file system 720 may be stored correspondingly to an address space 704 of a file 702. Meanwhile, the second file system 730 may not store the page. Therefore, the user buffer 710 may input/output the file data from the first file system 720 through the second file system 730 which does not have the page cache.

The files 701 and 702 (which may be file objects) refer to a data structure of a file which is currently managed in the file system layer. Each file system (i.e., stackable file system and native file system) generates a file object 701 for a corresponding file within a layer when the file is opened. Accordingly, the files 701 and 702 may correspond to memory-based expressions of files opened by a predetermined application program (process). Since the file object 701 and the file object 702 are generated and managed in each file system layer, the file object 701 and the file object 702 are different files and independent subjects in the memory. However, the file object 701 and the file object 702 may be generated according to a request of file opening of the same application program (e.g., a same user process).

The page cache 707 and 708 of the file may be managed through a data structure of the address space 704 of the file object 701.

Meanwhile, the stackable file system may include file systems of more layers. For example, a configuration of three layers other than a configuration of two layers according to the first file system and the second file system shown in FIG. 7 may be configured, which is described herein with reference to FIG. 8.

Figure 8:
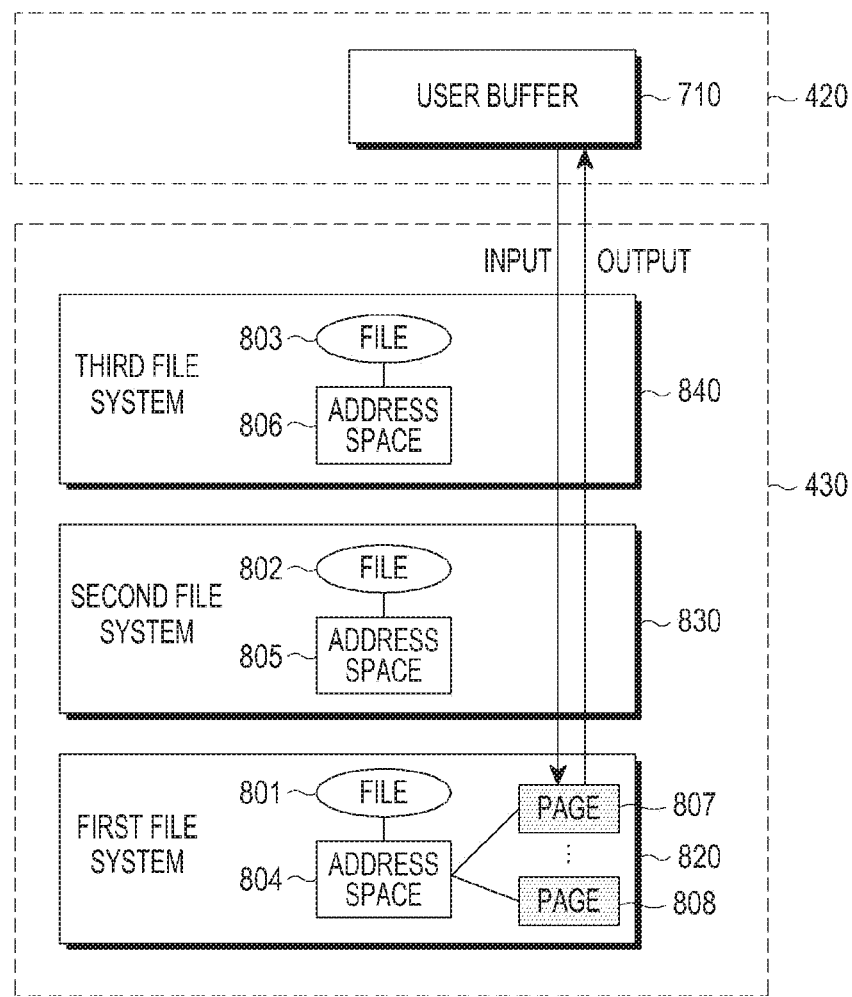

FIG. 8 is a conceptual diagram illustrating an operation of a stackable file system according to embodiments of the present disclosure.

Referring to FIG. 8, a first file system 820, a second file system 830, and a third file system 840 may be mounted in the operating system 430. Specifically, the first file system 820 may be mounted in a main memory of the program module 400, and the second file system 830 at a higher layer of a layer corresponding to the first file system 820 may be mounted in the main memory of the program module 400. Further, the third file system 840 at a higher layer of a layer corresponding to the second file system 830 may be mounted in the main memory of the program module 400. Herein, the first file system 820 may be a native file system for operating file data by an input/output device (e.g., the storage or the network). Further, the first file system 820 may be a stackable file system mounted in another file system. Also, the second file system 830 and the third file system 840 may be stackable file systems. The third file system 840 may be a highest file system which is interfaced by a virtual file system.

In a manner similar to the description of FIG. 7, the stackable file systems according to FIG. 8 may be various kinds of a stackable file system according to purpose. Since various stackable file systems have been described above, a detailed description will be omitted.

When at least one application process included in the application program 420 opens a file and inputs/outputs the file to a user buffer 710, the second file system 830 and the third file system 840 may not have page cache. For example, as shown in FIG. 8, one or more pages 807 and 808 corresponding to an opening file 801 may be stored in the first file system 820. The pages 807 and 808 stored in the first file system 820 may be stored correspondingly to an address space 804 of a file 802. Meanwhile, the second file system 830 and the third file system 840 may not store the page. Therefore, the user buffer 710 may input/output the file data from the first file system 820 through the second file system 830 and the third file system 840 which do not have the page cache.

The files 801, 802, and 803 (which may be file objects) refer to a data structure of a file which is currently managed in the file system layer. Each file system (i.e., a stackable file system and a native file system) generates a file object 801 for a corresponding file within a layer when the file is opened. More specifically, the files 801, 802, and 803 may correspond to memory-based expressions of files opened by a predetermined application program (e.g. an application process).

Since the file object 801, the file object 802, and file object 803 are generated and managed in each file system layer, the file object 801, the file object 802, and file object 803 are different files and independent subjects in the memory. However, the file object 801, the file object 802, and file object 803 may be generated according to a request of file opening of the same application program (e.g., a user process).

The page caches 807 and 808 of the file may be managed through a data structure of the address space 804 of the file object 801.

In the electronic device 101 according to embodiments of the present disclosure, at least one file system included in the stackable file system may not have or may selectively have the page cache. Therefore, the electronic device 101 may reduce use of the included memory and reduce a memory copy process between different file systems so that a performance of the file input/output operation can be improved.

Meanwhile, the electronic device 101 according to embodiments of the present disclosure may perform memory mapping by which a file or a device corresponds to a specific area of the memory or releases the correspondence. Accordingly, the process may open one file and convert an address related to the file opened through the memory mapping into an address which can use in the process. Further, the address space of the process may include a memory mapping space which is a space in which the process will map a device or a file to a memory space (e.g., a code, data, heap, and a stack), which the process uses, with a memory mapping command, which is described with reference to FIG. 9.

Figure 9:
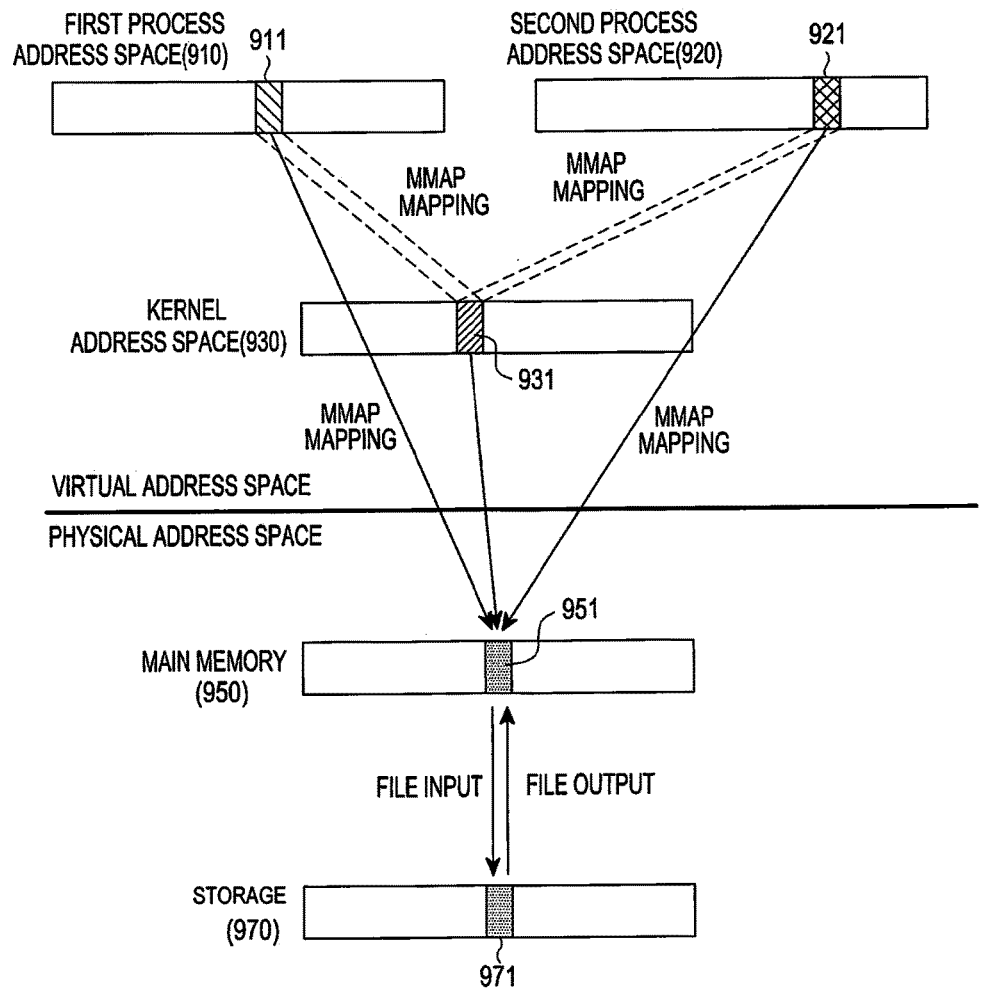
FIG. 9 is a conceptual diagram illustrating memory mapping according to embodiments of the present disclosure.

FIG. 9 is a conceptual diagram for memory mapping according to embodiments of the present disclosure. An operating system may provide an interface which maps a file to a virtual memory address space of a process. For example, there are an mmap system call of a Portable Operating System Interface (POSIX), a CreateFileMapping API of window, etc., as the interface which maps the file to the virtual memory address space.

Referring to FIG. 9, a first process address space 910, a second process address space 920, a kernel address space 930 may be included in the virtual address space, and a main memory 950 and storage 970 may be included in a physical address space.

A first area 911, which is a certain area of the first process address space 910, may be memory-mapped to a third area 931, which is a certain area of the kernel address space 930, and a second area 921, which is a certain area of the second process address space 920, may be memory-mapped to the third area 931 which the certain area of the kernel address space 930. Further, the mapped first area 911, second area 921, and third area 931 may be page-mapped to a fifth area 951 which is a certain area of the main memory 950, which is the same physical address space, and then actually be stored. Further, the fifth area 951 may input or output a file stored in a seventh area 971 of the storage 970. Therefore, each of the first process and the second process may convert a physical address related to the file stored in the seventh area 971 into addresses corresponding to the first area 911 and the second area 921 which are virtual addresses capable of being used by each process.

Through the memory mapping process, the process generates a virtual memory area for a file in the process address space. At this time point of mapping, actual file data may be read from the storage and may not be copied in the address space of the process. For example, when the first process maps a file corresponding to the seventh area 971, file data corresponding to the seventh area 971 may not be copied in the first process address space 910. Further, this process may be implemented through demand paging. The demand paging refers to a technology of mounting required data in the memory, and known technologies and a detailed description thereof will be omitted.

Meanwhile, the electronic device 101 according to embodiments of the present disclosure may examine, through a structure of a virtual memory area to be described below, whether a memory-mapped address is a valid address when an application program accesses a memory-mapped address area. Further, when the memory-mapped address is the valid address and an area mapped to the file, a page fault may be generated. Therefore, in the electronic device 101, a page fault handler may perform an input or output with a lower file system or storage through a fault handling routine registered in the file, and may thus read actual data. However, when mapping between the virtual memory management structures is damaged, kernel panic may be generated when page migration or page reclaiming is performed, which is described with reference to FIG. 10.

Figure 10:
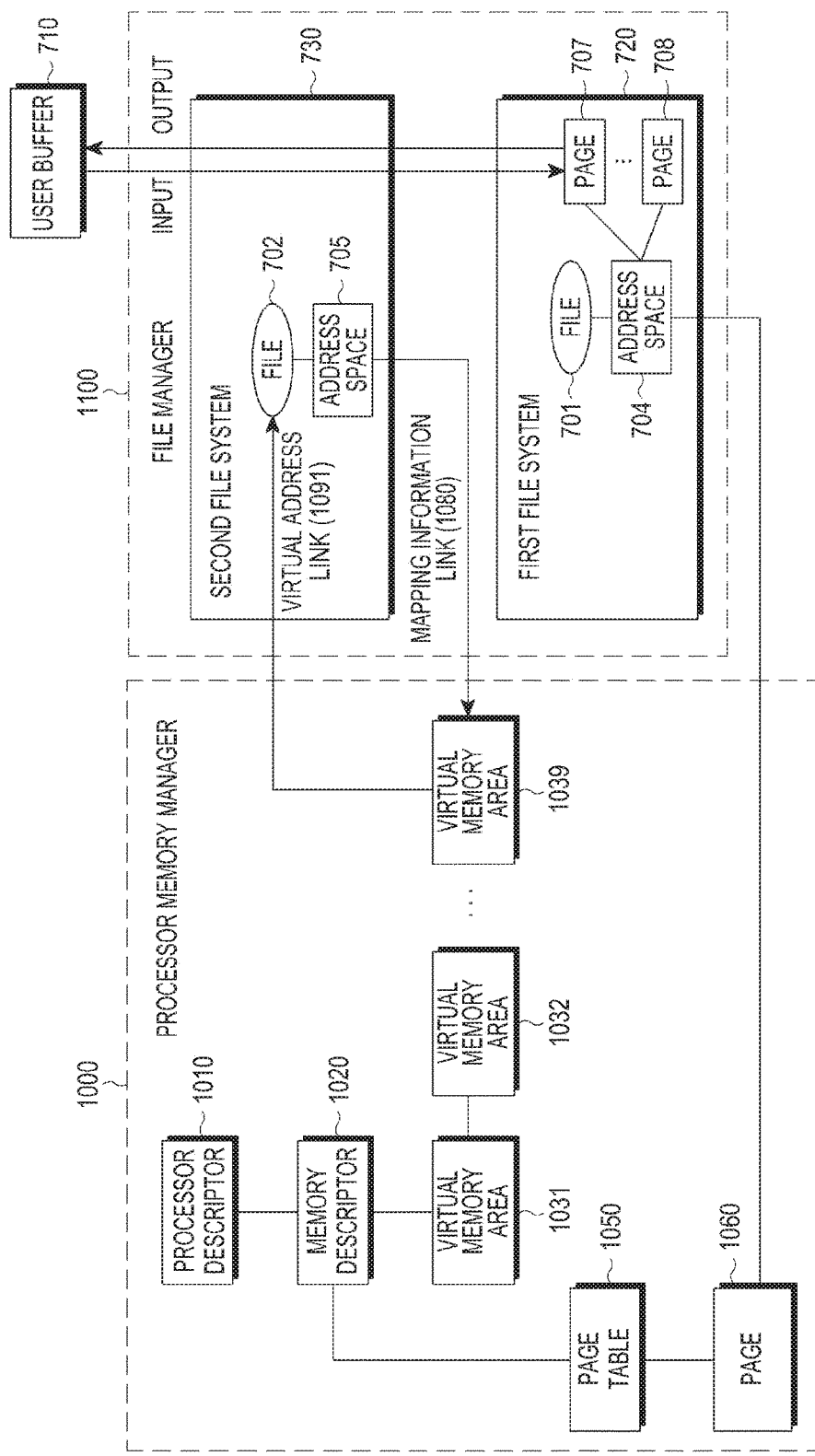
FIG. 10 is a conceptual diagram illustrating a memory mapping process according to embodiments of the present disclosure.

FIG. 10 is a conceptual diagram for a memory mapping process according to embodiments of the present disclosure.

Referring to FIG. 10, a process memory manager 1000 includes a process descriptor 1010, a memory descriptor 1020, one or more virtual memory areas 1031, 1032, and 1039, a page table 1050, and a page 1060. Herein, the process memory manager 1000 may correspond to a process management unit and/or a memory management unit included in the system resource manager 321 of the kernel 320. Further, a file management 1100 may manage the first file system 720 and the second file system 730. The process descriptor 1010 may manage information on the process, and may have various information related to the process such as a using file, an address space of the process, and a state of process. Herein, the process descriptor 1010 may refer to a structure for managing information on the process. Meanwhile, the process management unit may generate the process descriptor 1010 with respect to each running process.

The memory descriptor 1020 may manage a virtual address of the memory corresponding to a process address space. Each process may receive an allocation of a unique memory descriptor, and the memory descriptor 1020 may include the virtual memory area.

Each of the virtual memory areas 1031, 1032, and 1039 may have memory information allocated by one process. Each of the virtual memory areas 1031, 1032, and 1039 may have successive virtual addresses allocated in the address space and may be a data structure for displaying one virtual area in which file reading, writing, executing authorities are same.

The page table 1050 may store the page information of the process and may have page numbers and physical addresses corresponding to page numbers.

The page 1070 may be a page corresponding to the files 701 and 702 in the virtual memory area 1039.

According to an embodiment of the present disclosure, when memory mapping has been called by the application process of the electronic device 101, the file 702, which is a file object of the second file system 730 which is a highest file system, may be registered as a newly generated file of the virtual memory area 1039. Therefore, inter-links between the virtual memory area 1039 and the file 702 may be generated. For example, the virtual memory area 1039 may configure a virtual address link 1091 indicating the file 702, and the address space 705 corresponding to the file 702 may configure a mapping information link 1080 indicating a virtual memory area 1039. The second file system 730 may trace-back, on the basis of the mapping information link 1080 of the file, the virtual memory area 1039 to which the second file system 730 is mapped. When the application process of the electronic device 101 accesses an address space corresponding to the virtual memory area 1039, the application process may map the page 707 of the file 701 stored in the first file system 720 to the page table 1050 of the application process through a page fault handling routine registered in the second file system 730. However, in the address space 704 of the first file system 720, since mapping information for the virtual memory area 1039 is not configured in the mapping information link 1080, when the page 707 is page migrated to another address or is page reclaimed or reviewed, it is not considered that the page 707 is pre-referenced in the virtual memory area 1039.

Therefore, the electronic device 101 according to embodiments of the present disclosure may add a flag for a page cache to the file mode information of the file structure in the file system. Further, the electronic device 101 may generate a list of opening file objects between a plurality of file systems. Further, the electronic device 101 may generate a second virtual address link between the virtual memory area and the file of the highest file system of the stackable file system, which is described with reference to FIG. 11.

Figure 11:
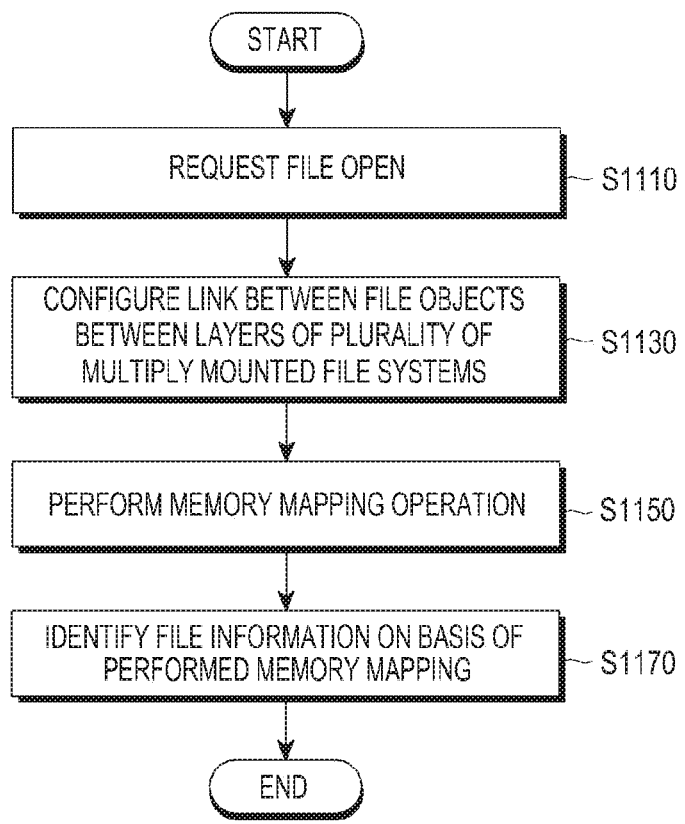
FIG. 11 is a flow chart illustrating an operating method of a memory system according to embodiments of the present disclosure.

FIG. 11 is a flow chart illustrating an operating method of an electronic device 101 according to embodiments of the present disclosure.

Referring to FIG. 11, in step 1110, an application program (e.g. a user process) of the electronic device 101 (e.g., the program module 400 or the processor 510) may request file open to the file system. For example, the application program may request the file open to the file system of a kernel by calling a file open system call. According to the request of the file open, the file system may configure links between file objects between layers of a plurality of file systems multiply mounted in step 1130. For example, links between file objects of a higher file system and a lower file system may be configured at a time point of the file open, and a non-mappable flag to be described below may be configured for a file flag of a file object of a corresponding file system when a file object of a file system of one layer does not manage a page cache, which is described with reference to FIG. 12.

Figure 12:
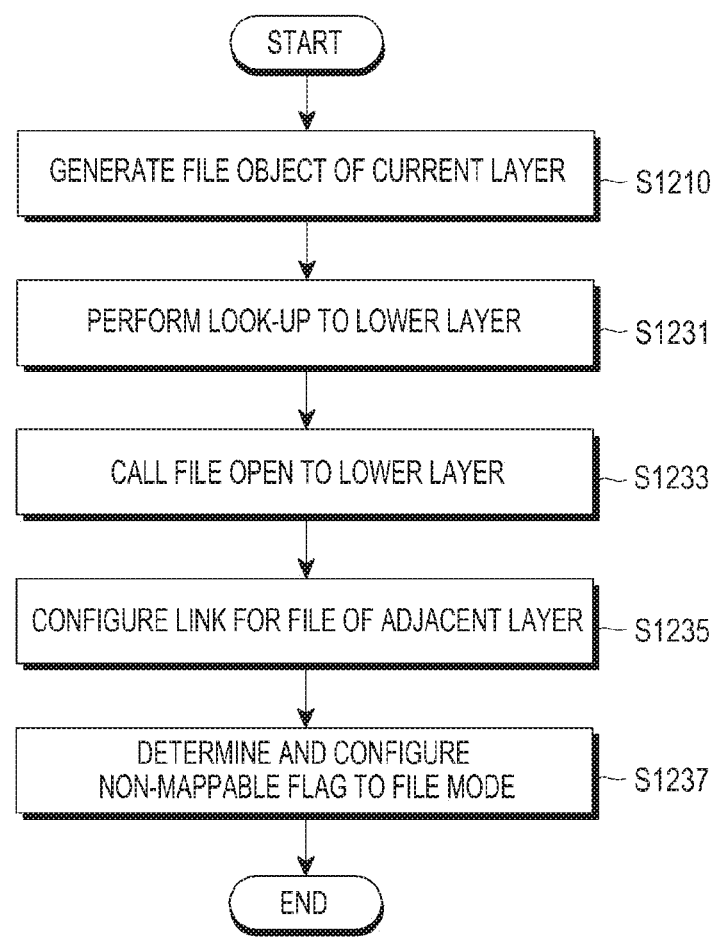
FIG. 12 is a flow chart illustrating a link configuration of a memory system according to embodiments of the present disclosure.

FIG. 12 is a flow chart illustrating a link configuration of a memory system according to embodiments of the present disclosure.

Referring to FIG. 12, in step 1210, one file system included in the electronic device 101 (e.g., the program module 400 or the processor 510) may generate a file object according to a request of file open. Herein, a current file system may be a predetermined file system at a lower layer of a layer corresponding to a virtual file system. Further, the current file system may obtain a higher file object as an open factor. In step 1231, the current file system may identify whether a file can be opened in a lower layer through look-up performance by the lower layer (e.g. file system or storage device) and then obtain information (e.g., Mode) on the file of the lower layer.

In step 1233, the current file system may call the file open to a lower file system by information of the file of the lower layer obtained in step 1231, and may receive a return of the file object address of the lower file system in response to the call. In this event, the current file system may transmit the file object address of the current layer generated in step 1231 to a factor when the lower file system file is opened. In step 1231, when the lower layer is not the file system but storage, the lower file open may not be called.

In step 1235, the current file system may configure an uplink (e.g., a first link) and a downlink (e.g., a second link) in list data of the file object of the current file system on the basis of information of the file address of the higher layer and the file address of the lower layer which are obtained in steps 1231 and 1233. A link configuration time point configuring a link in the link data is not limited to a specific time point, and may configure the uplink and the downlink in steps 1231 and 1233. According to an embodiment of the present disclosure, the current file system may not configure the uplink and may configure only the downlink.

The links for the file objects of the higher file system and the lower file system through the described method may be generated.

Meanwhile, the electronic device 101, according to embodiments of the present disclosure, may configure the links in a scheme of calling a memory mapping operation registered in the lower file object. For example, even though the memory mapping for the layer of one file system included in the stackable file systems is called, the current file system may configure both a file having an actual page cache and a file of the highest layer to be linked to the virtual memory address.

The current file system may additionally perform various operations on the basis of the configured links.

In step 1237, the electronic device 101 may determine whether a non-mappable flag is configured for file modes of the plurality of file systems, and may configure the non-mappable flag as a result of the determination.

According to embodiments of the present disclosure, the electronic device 101 may configure the non-mappable flag to the file mode of the file object which does not maintain the file data within a layer among the file objects of the plurality of file systems.

According to an embodiment of the present disclosure, the electronic device 101 may determine whether a lower file is the non-mappable by accessing the lower file object on the basis of the configured lower file link, and may or may not configure the non-mappable flag.

According to an embodiment of the present disclosure, until a file that is not non-mappable (i.e., a mappable file) is found according to the lower link, an operation of determining the non-mappable flag and an operation of configuring a flag may be repeated, which is described in further detail herein below.

Specifically, the electronic device 101 may configure the non-mappable flag to the file mode of the file system which does not maintain the page cache corresponding to the opened file among the plurality of multiply mounted file system. In the file mode, the non-mappable flag corresponds to a flag indicating whether the current file system layer includes and manages the file page cache. For example, the non-mappable flag may be "FMODE_NONMAPPABLE". According to embodiments of the present disclosure, the file mode is not limited to a special name referred to as "non-mappable".

The non-mappable flag may be checked for each file according to purpose when the file is opened in the application process.

According to embodiments of the present disclosure, the compression file system may compress or may not compress each file. In the compression file system, a compressed file may manage the page cache within the layer and a file, which is not compressed, may not manage the page cache within the layer.

According to an embodiment of the present disclosure, when the second file system corresponds to the compression file system, the second file system may not configure the non-mappable flag if it is determined that an opened file is compressed, and may configure the non-mappable flag as 1 if it is determined that the opened file is not compressed.

According to an embodiment of the present disclosure, links between file objects of a higher file system and a lower file system may be configured at a time point of the file open, and a non-mappable flag to be described below may be configured for a file flag of a corresponding file object when a file object does not manage a page cache in a file system of one layer.

According to an embodiment of the present disclosure, the non-mappable flag configuration may be performed when the memory is mapped. For example, the electronic device 101 may configure the non-mappable flag to the file system which does not maintain the file data of the plurality of file systems when the memory is mapped.

According to embodiments of the present disclosure, it may be implemented to allow the non-cacheable flag not to be used when the memory is mapped, and in the event, step 1237 of FIG. 12 may be omitted, which is also described herein with reference to FIG. 11.

In step 1150, the electronic device 101 performs a memory mapping operation. The electronic device 101 may perform a memory mapping operation according to the memory mapping request. which is described herein with reference to FIG. 13.

Figure 13:
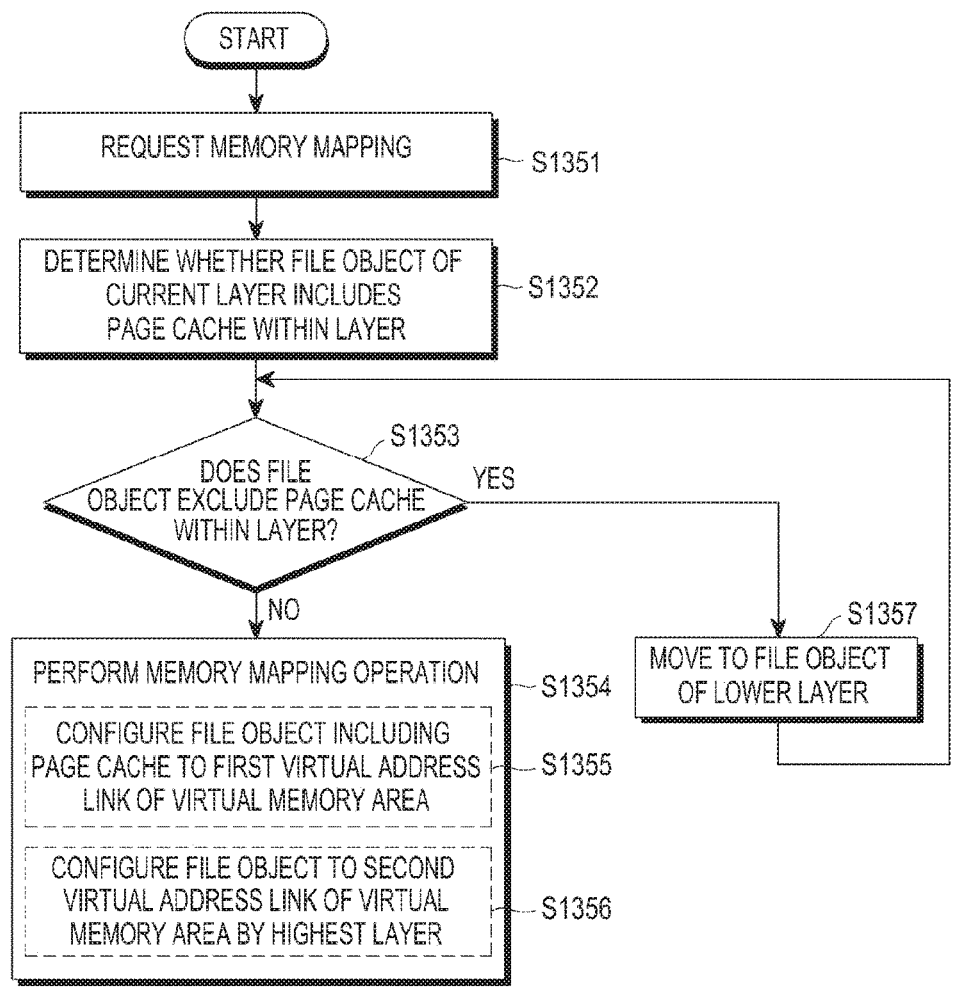
FIG. 13 is a flow chart illustrating a memory mapping process according to embodiments of the present disclosure.

FIG. 13 is a flow chart illustrating a memory mapping process according to embodiments of the present disclosure. Referring to FIG. 13, in step 1351, an application program (e.g., a user process) of the electronic device 101 (e.g., the program module 400 or the processor 510) may request memory mapping of the file to the file system. For example, the application program may request the memory mapping to the file system of a kernel by calling a memory mapping system call. The file system may receive a memory mapping input.

In step 1352, the electronic device may determine whether the file object of the current layer includes the page cache within the layer.

In an embodiment of step 1352, the file system may determine a file mode of the file object of a current layer.

When the electronic device 101 determines that the file object includes the page cache within the layer in step 1353, the electronic device 101 may perform the memory mapping operation in step 1354.

When the determined file mode is not non-mappable as an embodiment of step 1353, the electronic device 101 may perform the memory mapping operation in step 1354. Specifically, the electronic device 101 may search for whether the non-mappable flag is configured for the file in a memory mapping performance code when the memory mapping request is input, and the electronic device may perform the memory mapping operation when the file, which is not non-mappable, is found.

In step 1355, the electronic device 101 may configure a file object (e.g., the file object which is not non-mappable) including the page cache to a first virtual address link of a virtual memory area of an application program to which the file is to be mapped.

In step 1356, the electronic device 101 may configure a file object of a highest layer to a second virtual address link of the virtual memory area of the application program to which the file is to be mapped. According to embodiments of the present disclosure, the virtual memory area may not manage information for the second virtual address link, and in this event, step 1356 may be omitted, which is described herein with reference to FIG. 14.

Figure 14:
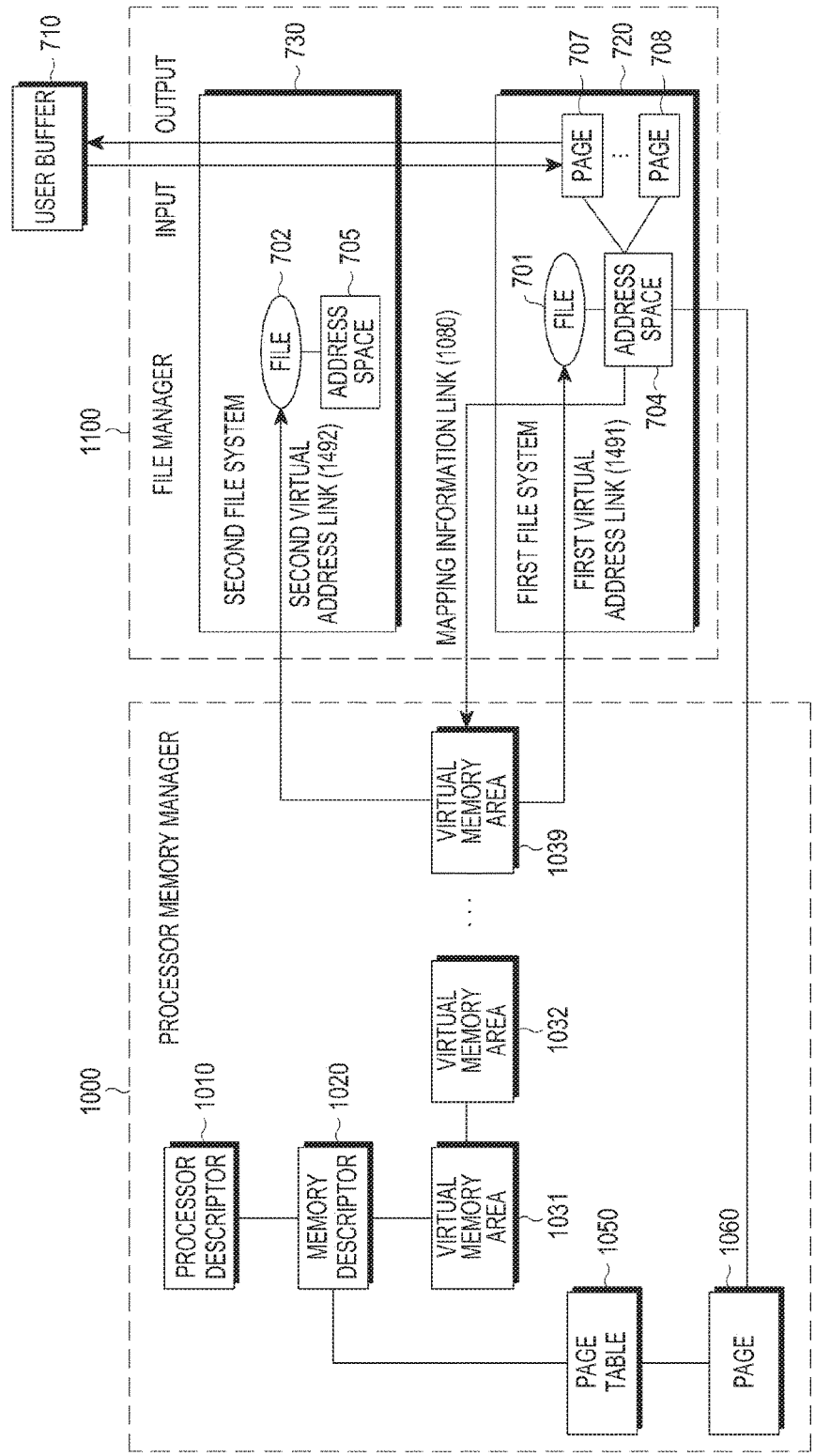
FIG. 14 is a conceptual diagram illustrating the memory mapping process according to embodiments of the present disclosure.

FIG. 14 is a conceptual diagram for the memory mapping process according to embodiments of the present disclosure.

Referring to FIG. 14, a process memory manager 1000 according to an embodiment of the present disclosure includes a process descriptor 1010, a memory descriptor 1020, one or more virtual memory areas 1031, 1032, and 1039, a page table 1050, and a page 1060. The process memory manager 1000 has been described herein above, and therefore a further description of the memory manager 1000 is omitted for clarity and conciseness. Each of the virtual memory areas 1031, 1032, and 1039 may have memory information allocated by one process.

The page table 1050 may store the page information of the process and may have page numbers and physical addresses corresponding to page numbers.

The page 1070 may be a page corresponding to the files 701 and 702 in the virtual memory area 1039.

According to an embodiment of the present disclosure, when memory mapping has been called by the application process of the electronic device 101, a memory mapping request may be transferred to the file 702, which is a file object of the second file system 730 which is a highest file system. In this event, the file 701 having an actual page cache of the lower file of the file 702 may be configured for a newly generated virtual address link of the virtual memory area 1039. Therefore, inter-links between the virtual memory area 1039 and the file 701 may be generated. The virtual memory area 1039 may configure a first virtual address link 1491 between the virtual memory area 1039 and the file 701 of the first file system 720 having the actual page cache. The address space 704 corresponding to the file 701 may configure a mapping information link 1080 indicating a virtual memory area 1039. Further, the electronic device may identify information on the virtual memory area 1039 using the mapping information link 1080 of the file 701 as necessary (e.g., in a state in which memory is lacking).

According to embodiments of the present disclosure, the virtual memory area 1039 may further have a second virtual address link 1492 other than the virtual address link 1491 configuring information of the file object to be memory-mapped. The virtual memory area 1039 may store, to the second virtual address link 1492, information of the file object 702 of the second file system 730 which is a highest file system of the stackable file systems. A method of utilizing the second virtual address link 1492 by the electronic device will be described, which is described herein with reference to FIG. 13.

When it is determined that the file object does not include the page cache within the layer in step 1353, the electronic device 101 moves to the file object of the lower layer in step 1357.

When the determined file mode is non-mappable as an embodiment of step 1353, the electronic device moves to the file object of the lower layer in step 1357. The electronic device 101 may search for whether the non-mappable flag is configured for the file in the memory mapping performance code, and when the file which is non-mappable has been found, the electronic device may find a file of the lower file system and determine whether the file mode of the file object is non-mappable. Further, the electronic device 101 may repeat and perform the described process until the file which is not non-mappable is found, which is also described with reference to FIG. 11.

In step 1170, the electronic device 101 may identify the file information on the basis of the performed memory mapping when the file mapping of the process is identified.

According to embodiments of the present disclosure, when identifying a current situation of the file mapping of the process through the process file system depending on a request of the application program 420, the electronic device 101 may identify the current situation of the file mapping on the basis of the configured second virtual address link. The process file system may correspond to a file system and a function module to which the application program can access in order to identify the file mapping current situation. According to an operating system of the electronic device, the process file system may be implemented by not the file system but by another type (e.g., a library module or a type of an API function).

For example, the application program such as a library linker may access the process file system in order to link the library and identify the current situation of the file mapping of the process. In this event, the process file system may output a file path according to not the first virtual address link but the second virtual address link. Therefore, when the second virtual address link of the virtual memory area is not null, the process file system may transfer information corresponding to the second virtual address link instead of the first virtual address link to the application program. According to an embodiment of the present disclosure, the process file system may output the file path on the second virtual address link not the first virtual address link.

According to embodiments of the present disclosure, when identifying a current situation of the file mapping of the process through the process file system depending on a request of the application program 420 after memory-mapping, the electronic device 101 may output the file path of the file object of the highest file system among the plurality of file systems. The electronic device may access the highest file object of the file object of the first virtual address link and output the file path. In this event, the electronic device accesses the highest file object using a link between the configured file objects in step 1130. In FIG. 11, step 1170 is a part in which an operation can be additionally performed according to a request of the application program in the electronic device, is not a necessary process in a development of the present disclosure. For example, the application program layer may request, to the kernel, a performance of steps 1110 to 1150, and may not request a performance of step 1170.

In FIG. 11, step 1150 corresponds to a method of memory-mapping the file of file system having (managing) the page cache in the layer, and the method of using the non-mappable file mode of FIG. 13 has been described, but the present disclosure is not limited to the corresponding embodiment. In step 1150, various implementation methods in which the file having (managing) the page cache in the layer can be memory-mapped to the process are possible. For example, whenever the process requests the memory mapping, the electronic device may identify whether the file of each file system manages the page cache.

Therefore, the electronic device 101 according to embodiments of the present disclosure can track-back a virtual memory area mapped in the memory, on the basis of the mapping information link of the file corresponding to the file having an actual page cache. Further, the present disclosure may refer to the file path of the highest file system through the second virtual address link corresponding to the highest file system when the file mapping situation of the process is identified through the process file system according to the request of the application program.

As described above, the electronic device 101 according to embodiments of the present disclosure may configure a link connecting the same files mounted in multiple stackable file systems, and may provide a flag indicating whether each file system included in the multiple stackable file systems maintains the page cache on the basis of the configured link.

Therefore, the electronic device 101 according to embodiments of the present disclosure may provide a valid file according to the virtual memory area on the basis of the provided flag.

Further, the electronic device 101 according to embodiments of the present disclosure may check the valid file even if page migration or page reclaiming is performed, on the basis of a valid virtual address link when the memory mapping is performed.

The electronic device 101 may not be limited to use of a specific operating system, and may be applied to various operating systems. Therefore, specific terms that refer to specific operating systems herein the description may also be interchangeably used with other corresponding terms that correspond to other operating systems. For example, in according to certain operating systems, terms such as "page" which is a unit for managing the memory, "page cache" which acts a buffer caching data in the memory, and "page cache of file" which caches, in the memory, data of file in the file system may be described by other terms according to other operation systems.

Each of the components of the electronic device according to the present disclosure may be implemented by one or more components and the name of the corresponding component may vary depending on a type of the electronic device. In embodiments of the present disclosure, the inspection apparatus may include at least one of the above-described elements. Some of the above-described elements may be omitted from the electronic device, or the inspection apparatus may further include additional elements. Further, some of the components of an electronic device according to the embodiments of the present disclosure may be combined to form a single entity that may execute functions equivalent to the functions of the corresponding elements prior to the combination.

The term "module" as used herein may, for example, refer to a unit including one of hardware, software, and firmware or a combination of two or more of them. The term "module" may be interchangeably used with, for example, the terms "unit", "logic", "logical block", "component", and "circuit". A module may be a minimum unit of an integrated component element or a part thereof. A module may be a minimum unit for performing one or more functions or a part thereof. A module may be mechanically or electronically implemented. For example, a module according to the present disclosure may include at least one of an application-specific integrated circuit (ASIC) chip, a field-programmable gate arrays (FPGA), and a programmable-logic device for performing operations which has been known or are to be developed hereinafter.

According to embodiments of the present disclosure, at least some of the devices (e.g., modules or functions thereof) or the method (for example, operations) according to the present disclosure may be implemented by a command stored in a computer-readable storage medium in a programming module form. The instruction, when executed by the processor 120, may cause the processor to execute the function corresponding to the instruction. The computer-readable storage medium may, for example, be the memory 130.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

A programming module according to the present disclosure may include one or more of the aforementioned components or may further include other additional components, or some of the aforementioned components may be omitted. Operations executed by a module, a programming module, or other component elements according to embodiments of the present disclosure may be executed sequentially, in parallel, repeatedly, or in a heuristic manner. Further, some operations may be executed according to another order or may be omitted, or other operations may be added.

In accordance with an aspect of the present disclosure, an electronic device for controlling a file system and an operating method thereof may be provided. Therefore, the electronic device may configure a link connecting the same files mounted in multiple stackable file systems, and may provide a flag indicating whether each page maintains the page cache in a plurality of file systems included in the stackable file systems, on the basis of the configured link. Accordingly, the electronic device may provide a valid file according to the virtual memory area on the basis of the provided flag. Further, the electronic device may check the valid file even if page migration or page reclaiming is performed, on the basis of a valid virtual address link when the memory mapping is performed.

Embodiments disclosed herein are provided merely to easily describe technical details of the present disclosure and to help the understanding of the present disclosure, and are not intended to limit the scope of the present disclosure. Accordingly, it should be interpreted that besides the embodiments listed herein, all modifications or modified forms derived based on the technical ideas of the present disclosure are included in the scope of the present disclosure as defined in the claims, and their equivalents.

What is claimed is:

1. An electronic device comprising:
a memory; and
at least one processor electrically connected to the memory,
wherein the memory stores instructions which, when executed by the at least one processor, cause the at least one processor to:
provide at least one first file system and a second file system stacked above the at least one first file system in the memory,
provide a virtual memory area including a virtual address for a file corresponding to a file mapping request in the memory, and
provide a first virtual address link between the virtual memory area and a file object of the at least one first file system including a page cache of the file corresponding to the file mapping request,
wherein the second file system is directly accessed by a virtual file system, in response to the file mapping request of a software program, and does not include the page cache.

2. The electronic device of claim 1, wherein the memory stores an instruction which, when executed by the at least one processor, causes the at least one processor to provide a second virtual address link between a file object of the second file system corresponding to the file mapping request and the virtual memory area.

3. The electronic device of claim 2, wherein the memory stores an instruction which, when executed by the at least one processor, causes the at least one processor to identify file mapping of a process corresponding to the software program on the basis of the second virtual address link.

4. The electronic device of claim 1, wherein the software program includes at least one of an application program, a process loader, and a library loader program, or a combination thereof.

5. The electronic device of claim 1, wherein the memory stores an instruction which, when executed by the at least one processor, causes the at least one processor to provide another file system, which does not provide a file object managing the page cache, at a higher layer of or a lower layer of a layer corresponding to the at least one first file system.

6. The electronic device of claim 1, wherein the memory stores an instruction which, when executed by the at least one processor, causes the at least one processor to provide a mapping information link of a file between a file system having the page cache of the file and the virtual memory area.

7. The electronic device of claim 6, wherein the memory stores an instruction which, when executed by the at least one processor, causes the at least one processor to identify the virtual memory area on the basis of the mapping information link of the file, when page migration or page reclamation of a page cache included in the file system having the page cache of the file is performed.

8. The electronic device of claim 1, wherein the memory stores an instruction which, when executed by the at least one processor, causes the at least one processor to set a non-mappable flag for a file flag of the at least one file system when at least one file system among a plurality of file systems including at least one of the second file system or the at least one first file system does not maintain a page cache corresponding to the file.

9. The electronic device of claim 8, wherein the memory stores an instruction which, when executed by the at least one processor, causes the at least one processor to set, when a virtual memory area for the memory mapping is generated with respect to a file system, in which the non-mappable flag is not configured, among the plurality of file systems, the first virtual address link for the virtual memory area and a file system having the page cache of the file, and the second virtual address link between the virtual memory area and the file object of the second file system of the file.

10. The electronic device of claim 9, wherein the memory stores an instruction which, when executed by the at least one processor, causes the at least one processor to move, when a file system corresponding to a current layer among the plurality of file systems corresponds to a file system in which the non-mappable flag is configured, to a file of the first file system of the file system corresponding to the current layer.

11. The electronic device of claim 10, wherein the memory stores an instruction which, when executed by the at least one processor, causes the processor to:
set, when the moved first file system corresponds to the file system in which the non-mappable flag is not configured, and when a virtual memory area for the memory mapping is generated, the first virtual address link for the virtual memory area and the file system having the page cache of the file, and
set the second virtual address link for the virtual memory area and the second file system of the file.

12. The electronic device of claim 8, wherein the memory stores an instruction which, when executed by the at least one processor, causes the at least one processor to set at least one link of an up-link corresponding to a file system mounted at an upper side of each file system of the plurality of file systems, and a down-link corresponding to a file system mounted at lower side of the each file system.

13. The electronic device of claim 12, wherein the memory stores an instruction which, when executed by the at least one processor, causes the at least one processor to set the non-mappable flag for a file system that does not maintain the page cache corresponding to the file among the plurality of file systems on the basis of at least one of the generated up-link and down-link.

14. A method of operating an electronic device, the method comprising:
providing at least one first file system and a second file system stacked above the at least one first file system in a memory of the electronic device;
providing a virtual memory area including a virtual address for a file corresponding to a file mapping request, in response to the file mapping request by a software program; and
providing a first virtual address link between the virtual memory area and a file object of the at least one first file system including a page cache of the file corresponding to the file mapping request,
wherein the second file system is directly accessed by a virtual file system, in response to the file mapping request of the software program, and does not include the page cache.

15. The method of claim 14, further comprising:
providing a second virtual address link between a file object of the second file system corresponding to the file mapping request and the virtual memory area.

16. The method of claim 14, wherein
the method further comprises identifying file mapping of a process corresponding to the software program on the basis of the second virtual address link.

17. The method of claim 16, further comprising:
providing a mapping information link of a file between a file system having the page cache of the file and the virtual memory area.

18. The method of claim 17, wherein identifying the file mapping of the process corresponding to the software program on the basis of the second virtual address link comprises identifying the virtual memory area on the basis of the mapping information link of the file when page migration or page reclamation of a page cache included in the file system having the page cache of the file is performed.

* * * * *